(12) United States Patent
Mishaeloff

(10) Patent No.: US 12,232,920 B2
(45) Date of Patent: Feb. 25, 2025

(54) DENTAL VENEER METHOD AND SYSTEM

(71) Applicant: Itay Mishaeloff, Tel Aviv (IL)

(72) Inventor: Itay Mishaeloff, Tel Aviv (IL)

( * ) Notice: Subject to any disclaimer, the term of this patent is extended or adjusted under 35 U.S.C. 154(b) by 0 days.

(21) Appl. No.: 17/227,840

(22) Filed: Apr. 12, 2021

(65) Prior Publication Data

US 2021/0315665 A1    Oct. 14, 2021

Related U.S. Application Data

(60) Provisional application No. 63/008,994, filed on Apr. 13, 2020.

(51) Int. Cl.
*A61C 5/30* (2017.01)
*A61C 1/07* (2006.01)

(52) U.S. Cl.
CPC . *A61C 5/30* (2017.02); *A61C 1/07* (2013.01)

(58) Field of Classification Search
CPC .... A61C 3/00; A61C 3/06; A61C 5/30; A61C 5/20; A61C 1/07; A61C 17/20
See application file for complete search history.

(56) References Cited

U.S. PATENT DOCUMENTS

| | | | | |
|---|---|---|---|---|
| 2,411,234 A | * | 11/1946 | Silver | A61C 3/06 433/122 |
| 4,353,696 A | * | 10/1982 | Bridges | A61C 17/20 433/119 |
| 6,139,320 A | * | 10/2000 | Hahn | A61C 5/40 433/119 |
| 8,002,546 B2 | * | 8/2011 | Viscomi | A61C 5/20 433/29 |
| 2002/0137009 A1 | * | 9/2002 | Kubein-Meesenburg | A61C 3/06 433/142 |
| 2009/0017420 A1 | * | 1/2009 | Jabri | A61C 3/06 433/136 |
| 2013/0115573 A1 | * | 5/2013 | Lampl | A61K 6/17 433/219 |
| 2015/0282906 A1 | * | 10/2015 | Jacobson-Shagan | A61C 13/0003 433/223 |

FOREIGN PATENT DOCUMENTS

| | | | | |
|---|---|---|---|---|
| CN | 107411827 A | * | 12/2017 | A61C 1/07 |
| DE | 19810100 A1 | * | 9/1998 | A61C 1/07 |

* cited by examiner

*Primary Examiner* — Heidi M Eide
(74) *Attorney, Agent, or Firm* — Patshegen IP; Moshe Pinchas

(57) ABSTRACT

There is disclosed a standardized system for the preparation of an area of a tooth for fitting a dental veneer, and the subsequent installation of the dental veneer onto the tooth, in the prepared area. The system uses a grinding oscillating tip, which is specific for a prefabricated or stock veneer, the prefabricated or stock veneer corresponding to the shape of grinding tip (the tip has the shape of the prefabricated or stock veneer).

14 Claims, 3 Drawing Sheets

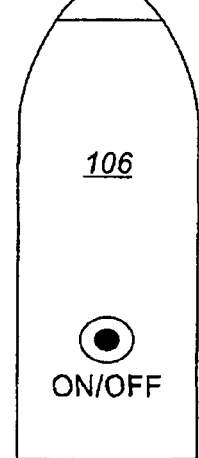
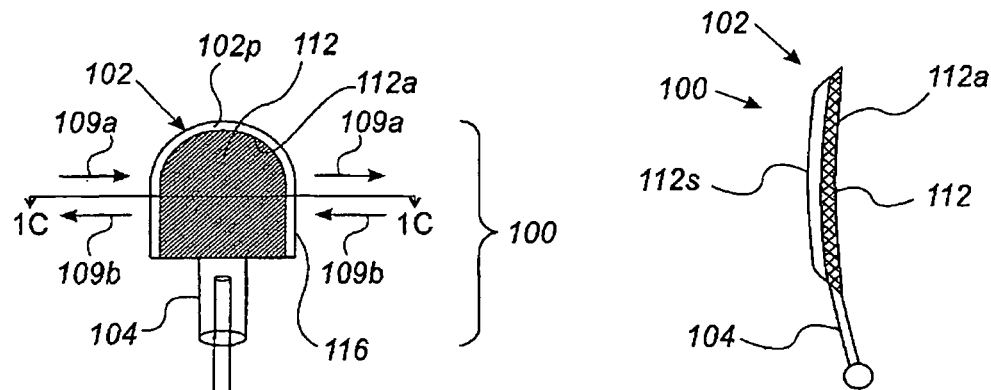
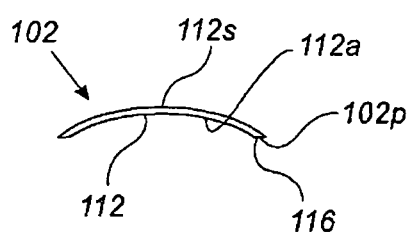
FIG. 1B
FIG. 1C
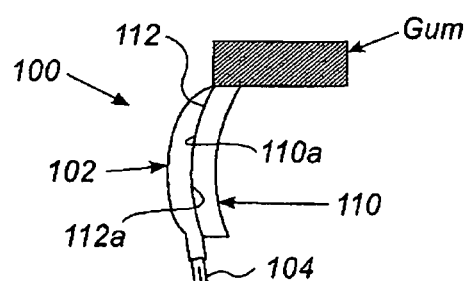
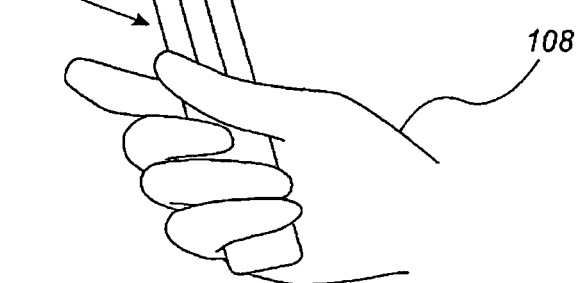
FIG. 2

DENTAL VENEER METHOD AND SYSTEM

CROSS-REFERENCES TO RELATED APPLICATIONS

This application is related to and claims priority from commonly owned U.S. Provisional Patent Application Ser. No. 63/008,994, entitled: DENTAL VENEER METHOD AND SYSTEM, filed on Apr. 13, 2020, the disclosure of which is incorporated by reference in its entirety herein.

TECHNICAL FIELD

The present disclosure is directed to dental veneers and their installation on teeth.

BACKGROUND

Dental veneers are being used increasingly in general as well as cosmetic dentistry. Contemporary dental veneer procedures and installations thereof exhibit drawbacks, in that they rely on the skill of the dentist, as well as the technician, the entire process takes time, involving at least two visits to the dentist's office, and is costly, leaving many people out of the market.

Initially, the dentist must be experienced and have good hand skills, to properly prepare the tooth for the veneer. This involves the dentist's skill at manipulating grinding instruments, such as diamond coated rotating burrs, so that the tooth, at its front or buccal surface, is ground to the proper depth to accommodate the veneer. Should the tooth buccal surface have been ground, so that it is too thick or too thin, the tooth will be damaged. Additionally, as the grinding is dependent on the dentist, each veneer to be produced by a technician is a one of a kind or custom veneer.

Next, the patient goes through a time consuming process, as the initial office procedure includes grinding the tooth, coupled with taking an impression of the now ground tooth. The dentist must now install a temporary veneer onto the prepared teeth, to maintain the prepared tooth, which adds to the time and cost of the procedure. The impression is then cast and a technician makes the veneer based on the cast. This process typically takes a few days to weeks, as the cast is shipped to the technician, the technician makes the veneer, and then sends the completed veneer to the dentist. The patient then returns to the dentist's office for a second procedure, where the veneer is installed.

As two dental procedures are involved to prepare and install the veneer, coupled with the technician's time and labor to make the veneer, plus shipping, the cost of veneers are expensive. This leaves many people out of the market, as they simply cannot afford the cost of the dental procedure and the veneer, or do not have the time for two dental office visits.

Stock or standard size veneers have been tried. However, use of these veneers is again dependent on the dentist's hand skill, as the dentist must now prepare the buccal surface, by grinding out an area of the proper depth to exactly fit the veneer. This is a difficult job, as it results in inaccuracies for even the most skilled dentists. This is because the dentist has to attempt to fit the inner surface of the veneer to the tooth preparation, many times by cutting from the inner surface of the veneer and the outer surface of the prepared teeth, which is highly inaccurate and time consuming, and typically results in poor aesthetics. To date, results have been poor, such that most dentists have abandon using stock or standard veneers.

Additionally, veneers known as "prep veneers" and "minimal prep veneers" can be installed on a prepared tooth. However, both of these aforementioned prep veneers require a technician to shape and dimension these veneers, based on a cast or impression, such that these veneers are custom made veneers. These veneers also result in poor aesthetics, and accordingly, are not used by many dentists.

SUMMARY

The present disclosed subject matter eliminates the inaccuracy of veneer installation process. The disclosed subject matter provides a standardized system for the preparation of the tooth for fitting the dental veneer, and the subsequent installation of the dental veneer onto the tooth. The system uses a grinding oscillating tip, which is specific for a prefabricated or stock veneer, the veneer corresponding to the shape of grinding tip (the tip has the shape of the prefabricated or stock veneer). The disclosed system saves time, as the veneer installation process in complete in a single dental office visit. The system eliminates the variability in skill between dentists and veneer technicians. Additionally, the system is affordable and can reach more people, as the number of dentist office visits is reduced, saving the patient money, and the lab and technician fees are reduced as standard sized veneers are produced for the systems.

Unless otherwise defined herein, all technical and/or scientific terms used herein have the same meaning as commonly understood by one of ordinary skill in the art to which the disclosure pertains. Although methods and materials similar or equivalent to those described herein may be used in the practice or testing of embodiments of the disclosed subject matter, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the disclosed subject matter are herein described, by way of example only, with reference to the accompanying drawings. With specific reference to the drawings in detail, it is stressed that the particulars shown are by way of example and for purposes of illustrative discussion of embodiments of the disclosed subject matter, and are typically not to scale. In this regard, the description taken with the drawings makes apparent to those skilled in the art how embodiments of the disclosure may be practiced.

Attention is now directed to the drawings, where like reference numerals or characters indicate corresponding or like components. In the drawings:

FIG. 1A is a diagram showing an apparatus for preparing a tooth for a veneer in accordance with embodiments of the disclosed subject matter;

FIG. 1B is a diagram of the apparatus of FIG. 1A attached to an ultrasonic/sonic tool;

FIG. 1C is a cross-sectional view of the apparatus of FIG. 1B taken along line 1C-1C;

FIG. 2 is a diagram showing the apparatus of FIGS. 1A, 1B and 1C being applied to the tooth to prepare the tooth for the veneer;

DETAILED DESCRIPTION OF THE DRAWINGS

Figure 3:
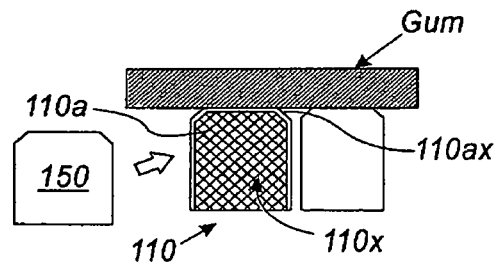
FIG. 3 is a diagram showing a veneer just prior to installation on a tooth prepared in accordance with embodiments of the disclosed subject matter being installed on the prepared tooth.

The present disclosed subject matter provides a standardized system for the preparation of an area of a tooth for fitting a dental veneer, and the subsequent installation of the dental veneer onto the tooth, in the prepared area. The system uses a grinding oscillating tip, which is specific for a prefabricated or stock veneer, the prefabricated or stock veneer corresponding to the shape of grinding tip (the tip has the shape of the prefabricated or stock veneer).

The present disclosed subject matter is directed to a dental veneer system that is standardized, in that an instrument grinds or prepares the tooth to dimensions and tolerances that fit a prefabricated or stock veneer. With the disclosed subject matter, the process of sizing, making and installing dental veneers, is no longer dependent on the manual performance of the dentist and/or the technician.

FIGS. 1A, 1B and 1C show the apparatus 100, which is coupled to an ultrasonic/sonic device 106 when grinding the tooth 110, e.g., the buccal surface 110a of the tooth 110, the tooth 110 being, for example, an incisor, to dimensions suitable for accommodating a veneer. The apparatus 100 includes a body 102, also known as an ultrasonic/sonic veneer cutting tip, or tip (the terms "body", "veneer cutting tip", and "tip", are used interchangeably herein), which is attached to a stalk or protrusion 104. The stalk (protrusion) 104 receives or otherwise attaches to the ultrasonic/sonic device 106. The ultrasonic/sonic device 106 is operated manually by the dentist 108 (FIG. 2), and provides forces to oscillate (shown by the arrows 109a, 109b of FIG. 1B) the body 102, to grind the buccal surface 110a of the tooth 110 to dimensions corresponding to the veneer 150 (FIGS. 3, 4B and 5) to accommodate the veneer 150 on the tooth 110 (i.e., the inner surface 150a (FIGS. 4B and 5) of the veneer 150 contacts the buccal surface 110a of the tooth 110).

The body 102 is shaped and dimensioned to correspond to the veneer 150 (FIGS. 3, 4B and 5) which is, for example, a prefabricated or stock veneer, which will be installed on the tooth 110 (in a prepared area 110x of the tooth 110). The body 102 includes an inner side 112, shaped and dimensioned like the veneer to be installed on the tooth 110. The body also includes an opposite outer side 112s, which is a non-working (non-grinding) side.

The body 102, for example, is typically curved to correspond to the shape of the tooth, as shown, for example, in FIG. 1C. For example, the curvature is such that the inner side 112 is concave. However, the curvature or flatness and overall shape of the body 102 is shaped to correspond to the shape of the tooth and the veneer 150, which is placed over the tooth 110 (i.e., the prepared area 110x of the tooth 110). The surface (working surface) 112a of the inner side 112, is coated with an abrasive material, such as diamond. When the body 102 is activated, by turning ON the ultrasonic/sonic device 106, the inner surface 112a grinds against the buccal surface 110a of the tooth 102, e.g., by ultrasonic/sonic vibrations/oscillations (represented by the arrows 109a and 109b) from the ultrasonic/sonic device 106, for example, at approximately 25,000 to 40,000 vibrations per second. The resultant grinding prepares an area 110x (FIGS. 3, 4A, 4B and 5) on the buccal surface 110a of the tooth 110, to the dimensions, which correspond to a veneer 150, e.g., a prefabricated or stock veneer, so as to fit the veneer 150 in the prepared area 110x on the 110 tooth (buccal surface 110a of the tooth 110), snugly, but at a tolerance with room for slight adjustments of the veneer 150 prior to fixation of the veneer 150 to the tooth 110.

Figure 4A:
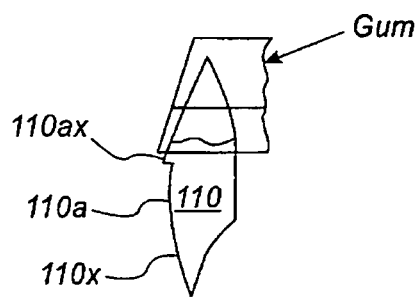
FIG. 4A is a diagram showing a vertical cross section of the prepared tooth of FIG. 3.
Figure 4B:
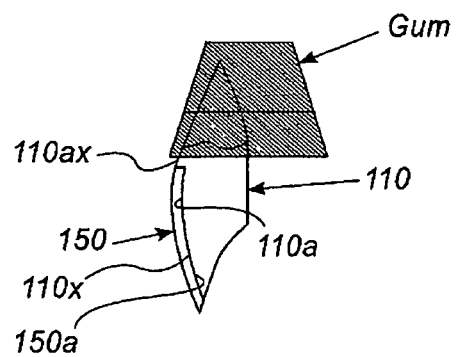
FIG. 4B is a diagram showing a vertical cross section of the tooth with the disclosed veneer installed thereon.

There are areas (portions) of the body 102 (the ultrasonic/sonic veneer tip) which are not coated with abrasive material for grinding, which include, for example, the area 116 along the periphery 102p of the body 102, around the inner surface (working surface) 112a (with the abrasive material). Each body 102, has a different shape and corresponds to a different tooth to be prepared, e.g., right and left central incisors. As a result, the surface (working surface) 112a of the body 102 corresponds to the inner surface 150a (FIGS. 4B and 5) and shape of the veneer 150, so that the veneer 150 seats in a prepared area 110x of the tooth 110 (FIGS. 3, 4A and 4B). The prepared area 110x was ground, for example, in accordance and in correspondence with the shape of the surface 112a of the body 102.

Figure 5:
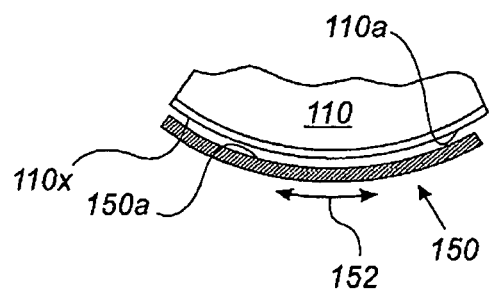
FIG. 5 is a diagram of a horizontal cross section of the tooth and veneer of FIG. 4B showing the veneer sliding on the prepared surface of the tooth in order to make slight positional adjustments of the veneer on the tooth, before fixing the veneer to the tooth.

FIG. 2 shows the apparatus 100, having received an ultrasonic/sonic tool 106 in the stalk (protrusion) 104, being placed against the tooth 110 at the buccal surface 110a, so that the surface 112a of the body 102 contacts the buccal surface 110a of the tooth 110, for the ultrasonic/sonic grinding procedure. The ultrasonic/sonic grinding procedure is such that the tooth 110, at its buccal surface 110a, is ground to a shape and depth, corresponding to, or approximately to, the thickness and/or shape of the veneer 150, so that the veneer 150, when installed on the tooth 110, seats in the prepared (ground) area 110x of the tooth 110, and is flush (or is made flush) with the unprepared buccal surface 110ax of the tooth 110 (FIG. 4B). For example, the prepared area 110x on the tooth 110 is in accordance with the shape of the surface 112a of the body 102 and extends into the tooth 110, for example, at a depth of approximately 0.3 mm to approximately 1.0 mm. As shown in FIG. 5, the surface 110a (and prepared area 110x) of the prepared tooth 110 (FIGS. 3 and 4A) and the inner surface 150a of the veneer 150 are designed to fit together, such that inner surface of the veneer 150a can slide on the tooth surface 110a. The veneer 150 is movable along the tooth 110 (as shown by the double headed arrow 152), allowing for small adjustments and corrections of the position of the veneer 150 on the tooth 110, before the veneer 150 is glued or otherwise adhered, attached, joined or bonded, to the surface 110a of the prepared area 110x of the tooth 110, as shown in FIG. 5. When the ultrasonic/sonic grinding procedure is complete, the apparatus 100 is taken out of contact with the tooth 110, as the buccal surface 110a of the tooth 110 is now ground to a certain sized area to correspond in shape and dimensions to fit a corresponding prefabricated or stock veneer, as shown in FIG. 3.

In FIGS. 3 and 4A, a prefabricated or stock veneer 150, sized and dimensioned in accordance with the surface 112a of the inner side 112 of the body 102, is installed on the buccal surface 110a of the tooth 110, within the dimensions (e.g., bounds) of the prepared area 110x. The veneer 150 installation (e.g., fixation) onto the tooth 110 is, for example, by standard dental adhesives and attachment techniques.

Figure 6A:
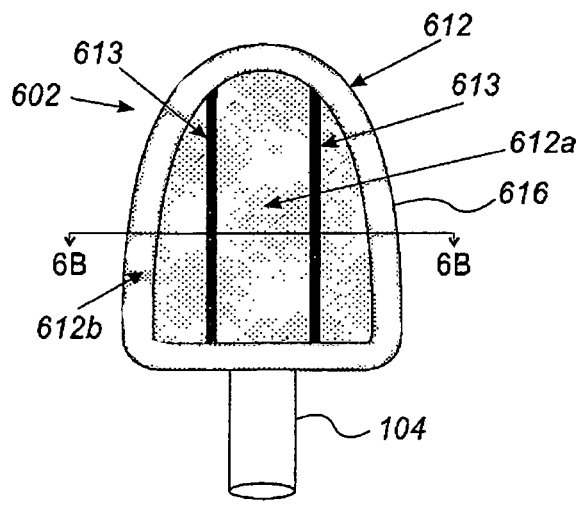
FIG. 6A is a diagram showing an apparatus for preparing a tooth for a veneer in accordance with other embodiments of the disclosed subject matter.
Figure 6B:
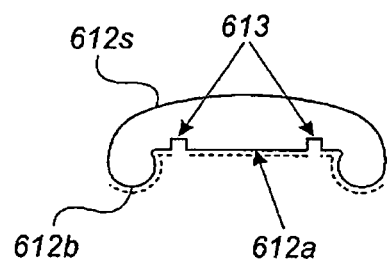
FIG. 6B is a cross-sectional view of the apparatus of FIG. 6A taken along line 6B-6B.

FIGS. 6A and 6B show an alternate body 602, for use with the oscillating tool 106, as discussed above. The body 602 is, for example, shaped and dimensioned to correspond to the veneer 150 (FIGS. 3, 4B and 5), as discussed above. The veneer 150 is, for example, a prefabricated or stock veneer, which will be installed on the tooth 110 (in a prepared area 110x of the tooth 110). In the embodiment of FIGS. 6A and 6B, elements corresponding to those on the body 602, are numbered correspondingly to those of the body 102, but are in the "600s", and take the descriptions for these elements as provided above.

Figure 7A:
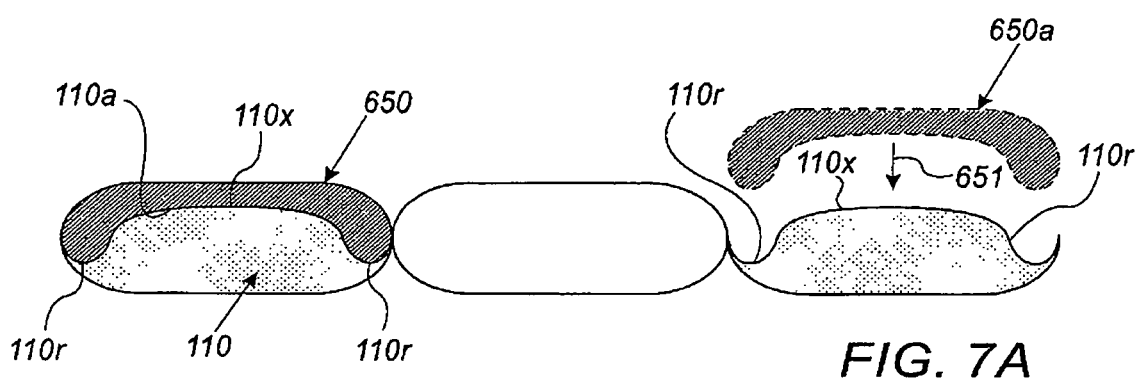
FIG. 7A is a view of a tooth prepared by the apparatus of FIGS. 6A and 6B shown with adjacent teeth, and a veneer; and, FIG. 7B is a side-view of the prepared tooth with a veneer of FIG. 7A.

The body 602 includes an inner side 612, shaped and dimensioned like the veneer to be installed on the tooth 110. The inside 612a and peripheral (outside) 612b working surfaces (inner surface) of the inner side 612, are, for example, coated with an abrasive material, such as diamond. The inside 612a and peripheral 612b working surfaces, for example, may be coated with the same or different abrasive materials, and as a further example, the peripheral working surface 612b may be coated with a more abrasive material than the inside working surface 612a. The peripheral surfaces 612b extend beyond the inside surface 612a, by being elevated, and include portions, e.g., curved or rounded, to grind the edges of the teeth (as shown in FIG. 6B), resulting in recessed portions 110r (FIG. 7A).

Grooves or indents 613 extend lengthwise in the inside working area 612a. For example, the grooves 613 are non-grinding/non-cutting areas, which serve as a stop surface, controlling the depth of the penetration into the tooth for the inside surface 612a during grinding/cutting. The body 602, for example, is typically curved or otherwise shaped to correspond to the shape of the tooth, as shown in FIG. 6B. While two grooves 613 are shown, one or more groves 613 are permissible, and for example, these one or more groves 613 extending lengthwise and in the case of plural grooves, extend substantially parallel or parallel to each other.

Figure 7B:
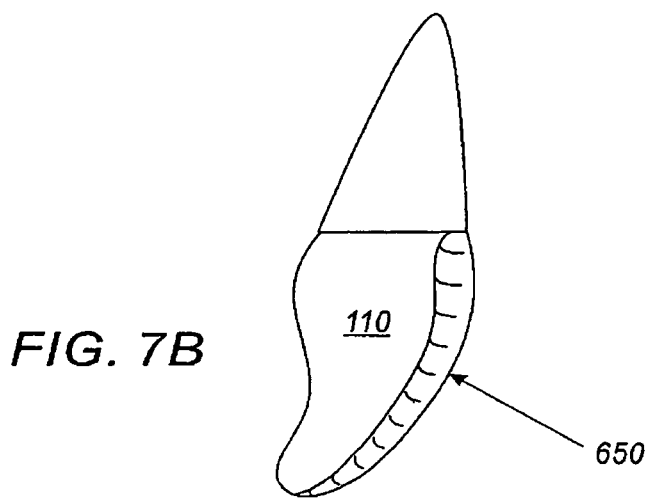

When the body 602 is activated, by turning ON the ultrasonic/sonic device 106 (FIG. 1B), the inner surfaces 612a, 612b, grind against the buccal surface 110a of the tooth 102, e.g., by ultrasonic/sonic vibrations/oscillations from the ultrasonic/sonic device 106, as detailed for the body 102 above. The resultant grinding prepares an area 110x (FIGS. 7A and 7B) on the buccal surface 110a of the tooth 110, to the dimensions, which correspond to a veneer 650 (similar to veneer 150 detailed above), including cutting recessed portions 110r into (and at) the edges of the tooth 110, to with corresponding edges of the veneer 650. Another veneer 650a is shown in broken lines in FIG. 7A, as it is seated (shown by the arrow 651) in the prepared area 110x of the tooth 110. e.g., a prefabricated or stock veneer, so as to fit the veneer 150 in the prepared area 110x on the 110 tooth (buccal surface 110a of the tooth 110), snugly, but at a tolerance with room for slight adjustments of the veneer 650 prior to fixation of the veneer 150 to the tooth 110, as detailed above (and also shown in FIGS. 3, 4B and 5). In FIG. 7B, the veneer 650 is shown from the side, and is, for example, symmetric, to fit the prepared area 110x of the tooth 110.

The disclosed subject matter is also usable with prep veneers, where the tooth undergoes a normal preparation, such as that disclosed herein, prior to installation, or a minimal prep veneer, where the tooth undergoes a minimal preparation, also in accordance with the disclosed subject matter. While the apparatus 100 is shown for one tooth of the normal 32 teeth (in the human mouth), an apparatus for a preparing each tooth of the 32 teeth for a standard veneer, as well as the prefabricated or stock veneer for each tooth of the 32 teeth, can be produced in accordance with the above disclosed subject matter. The 32 teeth for example, for which apparatus for preparing the teeth for the prefabricated or stock veneer, and the correspondingly shaped and dimensioned prefabricated or stock veneers, in accordance with the above disclosed subject matter include incisors, canine teeth, premolars, and molars, top and bottom teeth, and for left and right side teeth. Also, the aforementioned disclosed systems and methods are usable with other dental articles, such as caps, crowns, implants, and the like. Additionally, the disclosed subject matter is also suitable for veterinary uses.

Embodiments of the disclosed subject matter include a system for installing a dental veneer. The system comprises: a tip including a first side of predetermined dimensions, the first side including a portion of abrasive material, the predetermined dimensions representative of an area for: removal from a tooth by contact with the abrasive material, and, receiving a correspondingly dimensioned veneer. Additionally, the tip includes a portion for communicating with an oscillator.

Optionally, the system is such that it additionally comprises a veneer correspondingly dimensioned to the first side of the tip. Optionally, the system is such that the portion of the abrasive material is at least partially surrounded by a boundary of non-abrasive material at the periphery of the first side. Optionally, the system is such that the portion of the abrasive material includes a first portion (e.g., an outer area) extending along the periphery of the first side of the tip and a second portion within the first portion, the second portion defining an inside (inner) area of the first side of the tip. Optionally, the system is such that it additionally comprises an oscillator for oscillating the tip at speeds sufficient to remove material from a tooth. Optionally, the system is such that the oscillator vibrates the tip at ultrasonic speeds, for example, at approximately 25,000 to 40,000 vibrations per second. Optionally, the system is such that the boundary of the non-abrasive material is at a different elevation than the portion of the abrasive material. Optionally, the system is such that the periphery of the tip is elevated from the inner area of the tip.

Embodiments of the disclosed subject matter include a method for installing a dental veneer on a tooth. The method comprises: providing a tip for an oscillator, the tip including a first side of predetermined dimensions, the first side, for example, including an inner surface, and including a portion of abrasive material (e.g., forming the inner surface), the predetermined dimensions representative of an area for: removal from a tooth by contact with the abrasive material, and, receiving a correspondingly dimensioned veneer; oscillating the tip at speeds sufficient to remove material from a tooth; and, removing material of the tooth to provide an area of the tooth which is dimensioned to correspond to the predetermined dimensions of the tip.

Optionally, the method is such that it additionally comprises: obtaining a veneer correspondingly dimensioned to the first side of the tip. Optionally, the method is such that it additionally comprises: placing the veneer into the area which has been removed from the tooth. Optionally, the method is such that it additionally comprises: fixing the veneer into the area which has been removed from the tooth.

It is appreciated that certain features of the disclosure, which are, for clarity, described in the context of separate embodiments, may also be provided in combination in a single embodiment. Conversely, various features of the disclosure which are, for brevity, described in the context of a single embodiment, may also be provided separately or in any suitable sub-combination.

It will be appreciated by persons skilled in the art that the present disclosed subject matter is not limited to what has been particularly shown and described hereinabove. Rather the scope of the present disclosed subject matter is defined by the appended claims and includes both combinations and sub-combinations of the various features described hereinabove as well as variations and modifications thereof, which would occur to persons skilled in the art upon reading the foregoing description.

The invention claimed is:

1. A system for installing a dental veneer over a tooth, comprising:
 a tip including a first side of a predetermined shape and bounded by a perimeter, the first side including a first portion of a first abrasive material within an inner area of the first side and a second portion of a second abrasive material, along at least a portion of the perimeter, the first abrasive material being an abrasive material different than the second abrasive material, the first portion of the first abrasive material and the second portion of the second abrasive material forming a working surface of the first side of a predetermined topography, the working surface of the first side configured: 1) to cover a surface of the tooth, and 2) to operate on the surface of the tooth, when the working surface of the first side covers the surface of the tooth and the working surface of the first side is in oscillating contact with the tooth at ultrasonic speeds, without substantially moving the tip, to prepare the surface of the tooth with a topography corresponding to the predetermined topography of the working surface of the first side of the tip, in order for a veneer comprising an inner surface of a topography: 1) matching the predetermined topography of the working surface of the first side of the tip, and 2) corresponding to the topography of the prepared surface of the tooth, to fit over the prepared surface of the tooth in an engagement of the inner surface of the veneer with the prepared surface of the tooth; and,
 a portion in communication with the tip for communicating with an oscillator.

2. The system of claim 1, additionally comprising:
 a veneer including a perimeter including a shape corresponding to the perimeter of the predetermined shape of the first side of the tip.

3. The system of claim 1, wherein the oscillator vibrates the tip at speeds sufficient to remove material from the tooth by the oscillating contact.

4. The system of claim 3, wherein the oscillator vibrates the tip at ultrasonic speeds.

5. The system of claim 3, wherein the oscillator vibrates the tip at approximately 25,000 to 40,000 vibrations per second.

6. The system of claim 1, wherein the perimeter of the first side of the tip is elevated from the inner area of the tip.

7. The system of claim 1, wherein the predetermined shape of the first side of the tip includes the shape of the surface of the tooth.

8. The system of claim 7, wherein the surface of the tooth includes the buccal surface.

9. A system for installing a dental veneer over a tooth, comprising:
 a device comprising:
  a tip including a first side of a predetermined shape and bounded by a perimeter, the first side including a first portion of a first abrasive material within an inner area of the first side, and a second portion of a second abrasive material, along at least a portion of the perimeter, the first abrasive material being an abrasive material different than the second abrasive material, the first portion of the first abrasive material and the second portion of the second abrasive material forming a working surface of the first side of a predetermined topography, the working surface of the first side configured: 1) to cover a surface of the tooth, and 2) to operate on the surface of the tooth, when the working surface of the first side covers the surface of the tooth and the working surface of the first side is in oscillating contact with the tooth at ultrasonic speeds, without substantially moving the tip, to prepare the surface of the tooth with a topography corresponding to the predetermined topography of the working surface of the first side of the tip, in order for a veneer comprising an inner surface of a topography: 1) matching the predetermined topography of the working surface of the first side of the tip, and 2) corresponding to the topography of the surface of the prepared tooth, to fit over the prepared tooth in an engagement of the inner surface of the veneer with the surface of the prepared tooth; and
  a portion in communication with the tip for communicating with an oscillator, for oscillating the tip; and
 a veneer shaped in accordance with the predetermined shape of the first side of the tip and including an inner surface of a topography matching the predetermined topography of the working surface of the first side of the tip, the inner surface of the veneer corresponding to the topography of the surface of the prepared tooth to fit over the prepared tooth in an engagement of the inner surface of the veneer with the surface of the prepared tooth.

10. The system of claim 9, additionally comprising: an oscillator for vibrating the tip at speeds sufficient to remove material from the tooth by the oscillating contact.

11. The system of claim 10, wherein the oscillator vibrates the tip at ultrasonic speeds.

12. The system of claim 11, wherein the oscillator vibrates the tip at approximately 25,000 to 40,000 vibrations per second.

13. The system of claim 9, wherein the perimeter of the tip is elevated from the inner area of the tip.

14. A system for installing a dental veneer over a tooth, comprising:
 a tip including a first side of a predetermined shape and bounded by a perimeter, the first side including a first portion of a first abrasive material within an inner area of the first side and a second portion of a second abrasive material, along at least a portion of the perimeter, the first abrasive material being an abrasive material different than the second abrasive material, the perimeter including the second portion of the second abrasive material at a higher elevation than the remainder of the first side of the tip, and the first and second portions of the respective first and second abrasive materials forming a working surface of the first side of a predetermined topography, the working surface of the first side configured: 1) to cover a surface of the tooth, and 2) to operate on the surface of the tooth, when the working surface of the first side covers the surface of the tooth and the working surface of the first side is in oscillating contact with the tooth at ultrasonic speeds, without substantially moving the tip, to prepare the surface of the tooth with a topography corresponding to the predetermined topography of the working surface of the first side of the tip, in order for a veneer comprising an inner surface of a topography: 1) matching the predetermined topography of the working surface of the first side of the tip, and 2) corresponding to the topography of the prepared surface of the tooth, to fit over the prepared surface of the tooth in an engagement of the inner surface of the veneer with the prepared surface of the prepared tooth; and, a portion in communication with the tip for communicating with an oscillator.

* * * * *